J. SARGENT.
Apparatus for Supplying Steam to Buildings.
No. 221,105. Patented Oct. 28, 1879.
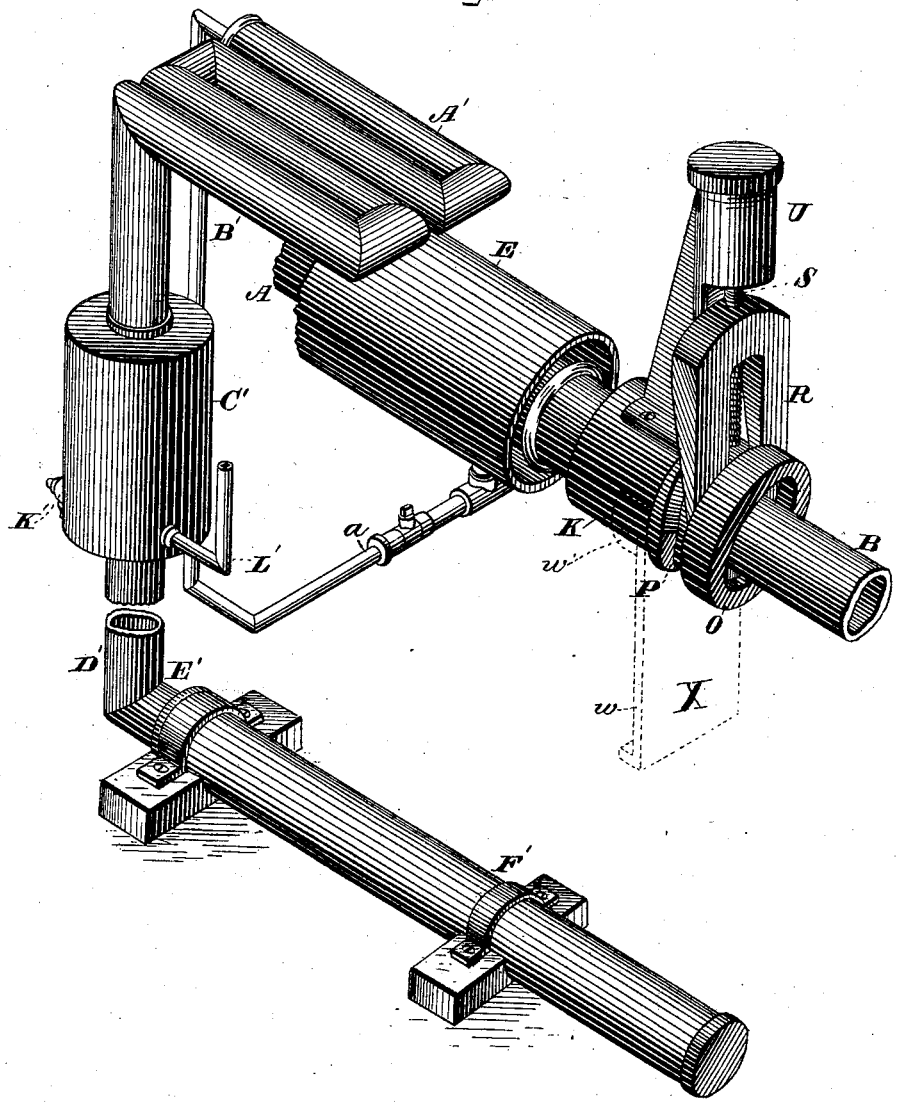

3 Sheets—Sheet 2.
J. SARGENT.
Apparatus for Supplying Steam to Buildings.
No. 221,105. Patented Oct. 28, 1879.
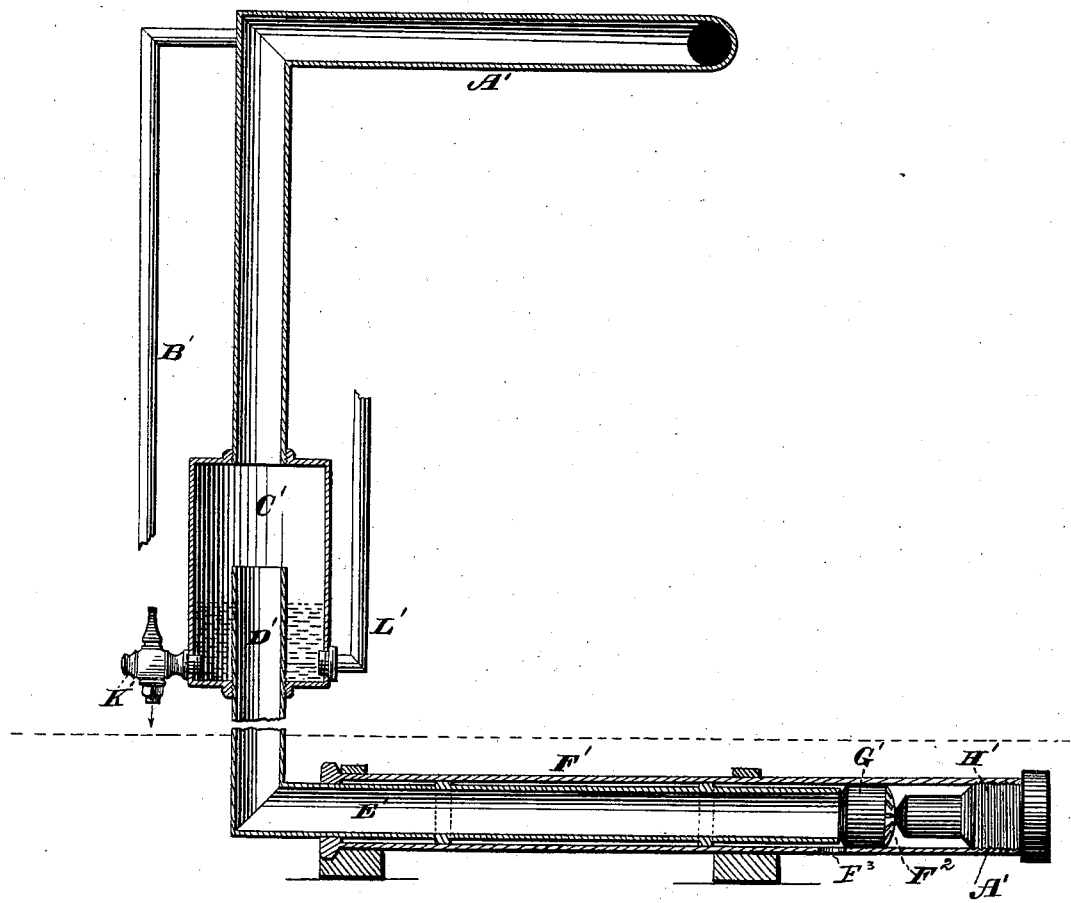

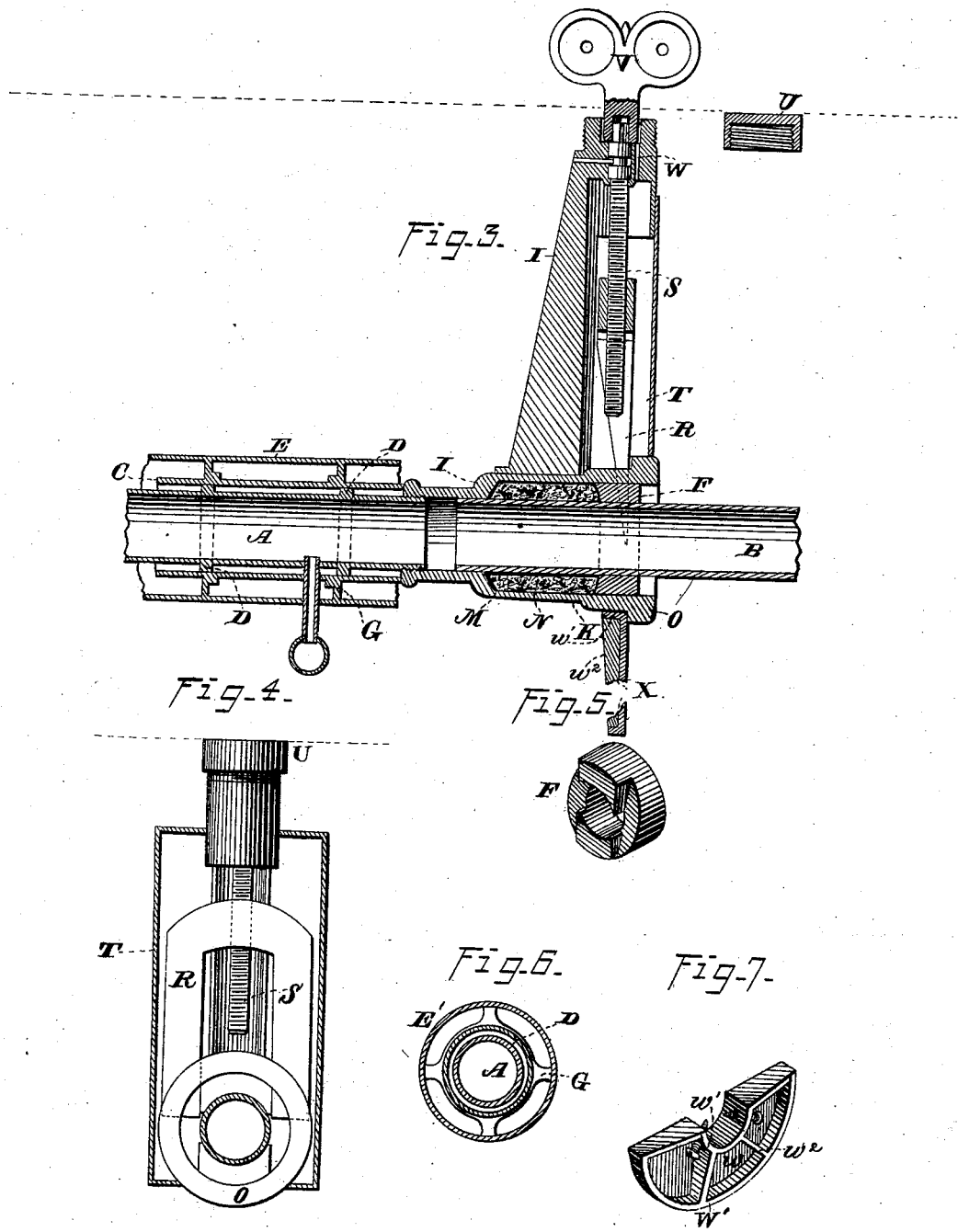

UNITED STATES PATENT OFFICE.

JAMES SARGENT, OF ROCHESTER, NEW YORK.

IMPROVEMENT IN APPARATUS FOR SUPPLYING STEAM TO BUILDINGS.

Specification forming part of Letters Patent No. 221,105, dated October 28, 1879; application filed September 18, 1879.

*To all whom it may concern:*

Be it known that I, JAMES SARGENT, of Rochester, in the county of Monroe and State of New York, have invented certain new and useful Improvements in Apparatus for Supplying Steam to the Buildings of a District or City, of which the following is a specification.

This invention relates to certain improvements in apparatus for supplying steam to the buildings of a district or city from a common generator or series of generators, for heating, and various domestic and industrial purposes; and it has for its object to provide an improved means for preventing the service-pipes leading from the street-mains to the buildings from being thrown out of line and injured by the expansion and contraction of the mains, occasioned by the variations of temperature to which said mains are subjected; also, to provide for tightening the packing at the joint between the expansible sections and the stationary sections of the main from which the service-pipes extend from above ground, whereby the usual man-holes, which are objectionable, may be dispensed with; further, to provide a means for indicating any leakage of steam at such points, so that the packing may be properly tightened; also to provide for the collection of a sufficient quantity of water of condensation in a heated state for any required domestic or industrial use; and, finally, to provide for the escape of any surplus water of condensation from the pipes automatically, so as to have the pipes free for the passage of steam, in order that the steam may take effect immediately when let into the pipes, all as more fully hereinafter specified.

My invention consists, first, in the combination, with the stationary main, of a junction-box connected therewith, provided with a cylindrical chamber adapted to receive the end of the expansible section of the same and the packing surrounding said end of the expansible section, the said junction-box carrying an annular follower provided with inclined bearing-surfaces and bifurcated wedge operated by means of a screw or other suitable mechanism above ground to force the annular follower against the packing and tighten it around the end of the expansible section when required to prevent leakage; second, in the combination, with the junction-box attached to the stationary section of the main, of a passage leading from the interior of said box upward through the portion terminating at the surface of the ground, through which any steam leaking from the joint may escape to indicate such leakage, in order that the packing may be properly tightened; third, in the combination, with the main and service pipes of a steam-supplying apparatus, of a reservoir provided with one or more water-delivery cocks or pipes and an overflow-pipe projecting through the bottom of said reservoir and extending upwardly therefrom, and communicating at its lower end with a waste-pipe provided with an automatic expansion-valve adapted to open and permit the escape of water of condensation when said pipe is cooled by the withdrawal of steam therefrom, but when steam is again supplied its heat causes the automatic valve to expand and close, thus preventing the escape of steam; fourth, in the combination, with the stationary section of main and the junction-box, of a laterally-extending wing secured to said junction-box or other stationary portion of the section, and adapted to be embedded in the earth or packed therein with concrete or stones, whereby it will be prevented from moving and will firmly hold said section and junction-box against displacement.

In the accompanying drawings, Figure 1 is a perspective view, showing the general arrangement of the main and its attachments, the heating apparatus connected therewith, the reservoir for collecting the water of condensation, and the expansion-valve connected therewith for automatically discharging the water of condensation. Fig. 2 represents a sectional view of the reservoir for collecting the water of condensation and the expansion-valve connected therewith; Fig. 3, a detached sectional view of the junction-box and stationary section of the main and a portion of the expansible section; Fig. 4, a front elevation of the junction-box with the front of the casing removed, showing the bifurcated wedge and its operating mechanism; Fig. 5, a detached perspective view of the follower for tightening the packing; Fig. 6, a detached cross-section of the stationary portion of the main and the cylindrical section for holding said main in the ground; and Fig. 7, a perspective view of a modification of the wing secured to the junction-box for holding same and stationary section firmly.

The letter A indicates one of the stationary sections of an underground steam street-main, from which the service-pipes $a$ extend to radiators A' or other heaters in buildings at either side, and B one of the expansible sections of said main. The letter C designates the cylindrical foundation or holding-section surrounding the stationary section of the main, said stationary section being provided with circumferential flanges D at suitable intervals, by means of which it is supported concentrically in the outside section.

The letter E indicates a cast-metal section, of cylindrical, or, it may be, semi-cylindrical, form, surrounding the holding-section and supported concentrically therewith by means of radial lugs or ribs G, projecting from said holding-sections. The cast-metal section E, when properly embedded in the earth, serves as a permanent casing for the holding-section and the stationary section A, so that the removable section may be detached from the junction-box, removed, and replaced without disturbing said junction-box or its other connections, as hereinafter more fully described.

The letter I indicates the junction-box secured to one end of the stationary main, consisting of a cylindrical section having an enlarged packing-chamber, K, in which the free end of the expansible section B of the street-main is adapted to set. Said enlarged chamber is provided with an abutment, M, against which the gasket or packing N is adapted to rest, being forced against the same by an annular follower, F, located in the forward end of said enlarged chamber. Said junction-box is provided with a flange, O, at its forward end, and immediately at the rear of said flange is slotted on opposite sides, as shown at P, the rear walls of said slot being inclined forward from the top to the bottom, as shown. Within said slots is adapted to work a bifurcated wedge, R, which may be elevated or depressed by means of a leading-screw, S, passing through the upper portion of the casing T, inclosing the bifurcated wedge and the forward portion of the junction-box, said upper tubular portion extending upward to the surface of the ground, and being provided with a screw-cap, U, to protect the upper end of the screw S, which is provided with a rectangular head, by means of which it may be turned by a suitable key, V. The said tubular portion of the inclosing-casing is provided with a vertical aperture, W, through which any steam leaking between the packing and the pipes may escape to the surface, in order to indicate such leakage.

The letter X indicates a supporting-standard secured to the forward end of the junction-box, which is embedded in the earth, and serves to support the said box and hold it against longitudinal displacement from the expansion and contraction of the main sections.

To the junction-box is firmly secured the standard, wing, or web X, (shown in dotted lines, Fig. 1,) consisting of a plate, $w$, having in its upper edge a segmental recess and a flange, $w'$, which embraces a portion of the junction-box, and is secured thereto by screws. The plate $w$ is strengthened by one or more ribs, $w^2$, radiating from its flanged recess.

The letter W', Fig. 7, indicates a modification of the wing, consisting of a semicircular plate with several radial ribs. The wing, of either form, is to be firmly embedded in the ground and secured by concrete or stones, and forms a firm support for the junction-box, securing it against displacement by the contraction and expansion of its connections. It also serves as a brace for the stationary section of the main when said section is attached to the junction-box.

The service-pipe $a$ communicates with one or more heating-coils, A', in the building or buildings to be heated by means of a pipe, B', and said coil extends downward and connects with a reservoir, C', located in the building. From within said reservoir at a point above the bottom extends a pipe, D', connecting with a horizontal pipe, E', extending into a surrounding pipe, F', and terminating near its forward end. Against the forward end of said pipe E' sets a beveled follower, G', which is adjustably held by a set-screw, A', secured in the forward end of the pipe F', and provided at its rear end with a spring-bearing, F², resting against the follower G'. The tube E', in connection with the follower G', forms an automatic expansion-valve, which will be opened and closed by the contraction and expansion of the said tube E', to permit the escape of water of condensation, which passes out through an opening, F³, in the pipe F' when the said pipe is cooled during the absence of steam therefrom, or heated when steam is supplied thereto.

The letter K' indicates a stop-cock secured to the lower part of the reservoir, by means of which the water collected therein may be drawn off for use, and L' a tube leading into the upper part of the building to supply the same with water, which is elevated by the pressure of the steam in the reservoir.

The operation of my invention will be readily understood in connection with the above description. Steam being admitted from the generator into the main it passes, upon opening suitable stop-cocks in the service-pipe, into the heating apparatus in the building, where it gives off its heat and is condensed, the water of condensation collecting in the reservoir, from which it may be distributed to the various parts of the building. Should water be condensed beyond the capacity of the reservoir to hold it, the surplus will pass to the automatic expansion-valve, where it will be discharged automatically when the steam has been turned off and the pipes cooled during the night, leaving the pipes free for the introduction of steam next morning.

What I claim is—

1. In combination with the stationary section of the main, a junction-box connected therewith, provided with a cylindrical chamber adapted to receive the end of the expansible section of the main and the packing surrounding the same, the said junction-box carrying an annular follower provided with inclined bearing-surfaces and a bifurcated wedge operated by a screw or other suitable mechanism above ground to force the annular follower against the packing, whereby the same may be tightened, substantially as and for the purposes specified.

2. In combination with the junction-box attached to the stationary section of the main, a passage leading from the interior of said box through the upper portion of the same, terminating at the surface, through which any steam leaking from the packing-joint may escape to indicate such leakage, substantially as and for the purposes specified.

3. The combination, with the main and service pipes of a steam-supplying apparatus, of a reservoir provided with one or more water-delivery cocks or pipes and an overflow-pipe projecting through the bottom of said reservoir and extending upwardly therefrom, and communicating at its lower end with a waste-pipe provided with an automatic expansion-valve adapted to open and permit the escape of water of condensation when said pipe is cooled by the withdrawal of steam therefrom, substantially as described.

4. The combination, with the stationary section of main and the junction-box, of a laterally-projecting wing secured to said junction-box or other stationary portion of the said section and adapted to be embedded in the earth, substantially as described.

5. The combination, with the junction-box, of the wing X, consisting of the plate $w$, having the flanged recess and one or more ribs, $w^2$, substantially as described.

In testimony that I claim the foregoing I have hereunto set my hand in the presence of the subscribing witnesses.

JAMES SARGENT.

Witnesses:
JAMES L. NORRIS,
ALBERT H. NORRIS.